United States Patent
Xie et al.

(10) Patent No.: US 10,984,556 B2
(45) Date of Patent: Apr. 20, 2021

(54) METHOD AND APPARATUS FOR CALIBRATING RELATIVE PARAMETERS OF COLLECTOR, DEVICE AND STORAGE MEDIUM

(71) Applicant: BAIDU ONLINE NETWORK TECHNOLOGY (BEIJING) CO., LTD., Beijing (CN)

(72) Inventors: Yuanfan Xie, Beijing (CN); Xun Zhou, Beijing (CN); Shirui Li, Beijing (CN); Liang Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/561,698

(22) Filed: Sep. 5, 2019

(65) Prior Publication Data

US 2020/0082571 A1     Mar. 12, 2020

(30) Foreign Application Priority Data

Sep. 7, 2018   (CN) .......................... 201811043273.9

(51) Int. Cl.
*G06T 7/80*     (2017.01)
*G06T 7/73*     (2017.01)

(52) U.S. Cl.
CPC .................. *G06T 7/85* (2017.01); *G06T 7/73* (2017.01); *G06T 2207/10028* (2013.01)

(58) Field of Classification Search
CPC ... G06T 7/55; G06T 2207/10028; G06T 7/73; G06T 7/80; G06T 7/85
See application file for complete search history.

(56) References Cited

U.S. PATENT DOCUMENTS

2016/0012588 A1* 1/2016 Taguchi ............... H04N 13/257
                                                                348/46
2018/0106592 A1* 4/2018 Labbe, Jr. ................. G01S 5/16

FOREIGN PATENT DOCUMENTS

CN          103049912 A       4/2013
CN          107067437 A       8/2017
              (Continued)

OTHER PUBLICATIONS

Zhu, C. et al., Robust Plane-based Calibration of Multiple Non-Overlapping Cameras, 2016 Fourth International Conference on 3D Vision (3DV), IEEE, Oct. 25, 2016, pp. 658-666.
(Continued)

*Primary Examiner* — Dave Czekaj
*Assistant Examiner* — Berteau Joisil
(74) *Attorney, Agent, or Firm* — Lathrop GPM LLP (57) ABSTRACT

The present disclosure provides a method for calibrating relative parameters of a collector, an apparatus for calibrating relative parameters of a collector, a device and a storage medium. The technical solution of the present disclosure may determine target position and attitude information of a target image collector in a calibration coordinate system when each target image is collected, determine the first position information of a spatial point in a three-dimensional scene point cloud in the calibration coordinate system and the second position information a projection point of the spatial point in each target image, and determine a relative position and attitude value between the target image collector and the reference collector based on the target position and attitude information corresponding to each target image, the first position information and the second position information.

11 Claims, 3 Drawing Sheets

(56) References Cited

FOREIGN PATENT DOCUMENTS

| | | | |
|---|---|---|---|
| CN | 108288294 A | 7/2018 | |
| CN | 108447097 A | 8/2018 | |
| JP | 2003279315 A | 10/2003 | |
| JP | 2008146024 A | 6/2008 | |
| JP | 2014101075 A | 6/2014 | |

OTHER PUBLICATIONS

European Patent Application No. 19193809.1 extended Search and Opinion dated Nov. 29, 2019, 9 pages.
Chinese Patent Application No. 201811043273.9 First Office Action dated Apr. 24, 2020, 20 pages.
Chinese Patent Application No. 201811043273.9 English translation of First Office Action dated Apr. 24, 2020, 26 pages.
Japanese Patent Application No. 2019160978 First Office Action dated Jul. 21, 2020, 6 pages.
Japanese Patent Application No. 2019160978 English translation of First Office Action dated Jul. 21, 2020, 6 pages.
Zhang Qin et al.; Calibration method for integrated camera and laser scanner system based on bi-view feature matching; Chinese Journal of Scientific Instrument, vol. 33, No. 11; Nov. 2012, pp. 2622-2628.

\* cited by examiner

METHOD AND APPARATUS FOR CALIBRATING RELATIVE PARAMETERS OF COLLECTOR, DEVICE AND STORAGE MEDIUM

This application is based on and claims priority of Chinese Patent Application 201811043273.9, filed on Sep. 7, 2018, the entire contents of which are incorporated herein by reference.

FIELD

The present disclosure relates to computer visual technology, and more particularly, to a method for calibrating relative parameters of a collector, an apparatus for calibrating relative parameters of a collector, a device and a storage medium.

BACKGROUND

A calibration of outer parameters of several collectors, such as the calibration of a relative position and attitude value between a camera and another camera, is an indispensable and important step for a system containing the several collectors to perform effective and reliable operations. At present, a traditional method for calibrating the outer parameters of the several collectors includes: setting a calibration object in a scene, performing an image collection on the scene containing the calibration object by several collectors having overlapping field of view simultaneously, and determining a relative position and attitude value between different collectors based on the scene images containing the calibration object collected by the several collectors.

However, an autopilot system is typically provided with several collectors having non-overlapping field of view and because the several collectors cannot collect the calibration object simultaneously, it is important to realize calibration of the outer parameters of several collectors having non-overlapping field of view.

DISCLOSURE

Embodiments of the present disclosure provide a method for calibrating relative parameters of a collector, an apparatus for calibrating relative parameters of a collector, a device and a storage medium, so as to optimize realization of the calibration of outer parameters of several cameras having non-overlapping field of view.

In a first aspect, embodiments of the present disclosure provide a method for calibrating relative parameters of a collector, including: determining, based on reference position and attitude information of a reference collector in a calibration coordinate system when a target image collector collects at least two target images and a relative position and attitude variable between the reference collector and the target image collector, target position and attitude information of the target image collector in the calibration coordinate system when each target image is collected by the target image collector; reconstructing, based on the target images, a three-dimensional scene, and determining first position information of a spatial point in a three-dimensional scene point cloud in the calibration coordinate system and second position information of a projection point of the spatial point in each target image; and determining, based on the target position and attitude information corresponding to each target image, the first position information and the second position information, a first relative position and attitude value between the target image collector and the reference collector.

In a second aspect, embodiments of the present disclosure provide an apparatus for calibrating relative parameters of a collector, including: a first determining module, configured to determine, based on reference position and attitude information of a reference collector in a calibration coordinate system when a target image collector collects at least two target images and a relative position and attitude variable between the reference collector and the target image collector, target position and attitude information of the target image collector in the calibration coordinate system when each target image is collected by the target image collector; a second determining module, configured to reconstruct, based on the target images, a three-dimensional scene, and determine first position information of a spatial point in a three-dimensional scene point cloud in the calibration coordinate system and second position information of a projection point of the spatial point in each target image; and a third determining module, configured to determine, based on the target position and attitude information corresponding to each target image, the first position information and the second position information, a first relative position and attitude value between the target image collector and the reference collector.

In a third aspect, embodiments of the present disclosure provide an electronic device, including one or more processors and a memory for storing one or more programs. When the one or more programs are executed by the one or more processors, the one or more processors are caused to perform the method for calibrating relative parameters of a collector of any embodiment of the present disclosure.

In a fourth aspect, embodiments of the present disclosure provide a computer-readable storage medium having a computer program stored thereon. When the computer program is executed by a processor, the method for calibrating relative parameters of a collector according to any embodiment of the present disclosure is performed.

The embodiments of the present disclosure provide a method for calibrating relative parameters of a collector, including: determining, based on reference position and attitude information of a reference collector in a calibration coordinate system when a target image collector collects at least two target images and a relative position and attitude variable between the reference collector and the target image collector, target position and attitude information of the target image collector in the calibration coordinate system when each target image is collected by the target image collector; reconstructing, based on the target images, a three-dimensional scene, and determining first position information of a spatial point in a three-dimensional scene point cloud in the calibration coordinate system and second position information of a projection point of the spatial point in each target image; and determining, based on the target position and attitude information corresponding to each target image, the first position information and the second position information, a first relative position and attitude value between the target image collector and the reference collector. The technical solution of the present disclosure provides a new method for calibrating a relative position and attitude value, which may realize the calibration of outer parameters of several cameras having non-overlapping field of view without setting a calibration object in the scene, thus improving convenience of the calibration of outer parameters of several cameras.

EMBODIMENTS OF THE PRESENT DISCLOSURE

Referring to the following descriptions and drawings, these and other aspects of the embodiments of the present disclosure will be described. It should be noted that, the embodiments described herein with reference to drawings are used to generally explain the present disclosure, rather than limiting the present disclosure. Further, it should be noted that, for ease of description, the drawings only show parts related to the present disclosure rather than every part.

First Embodiment

Figure 1:
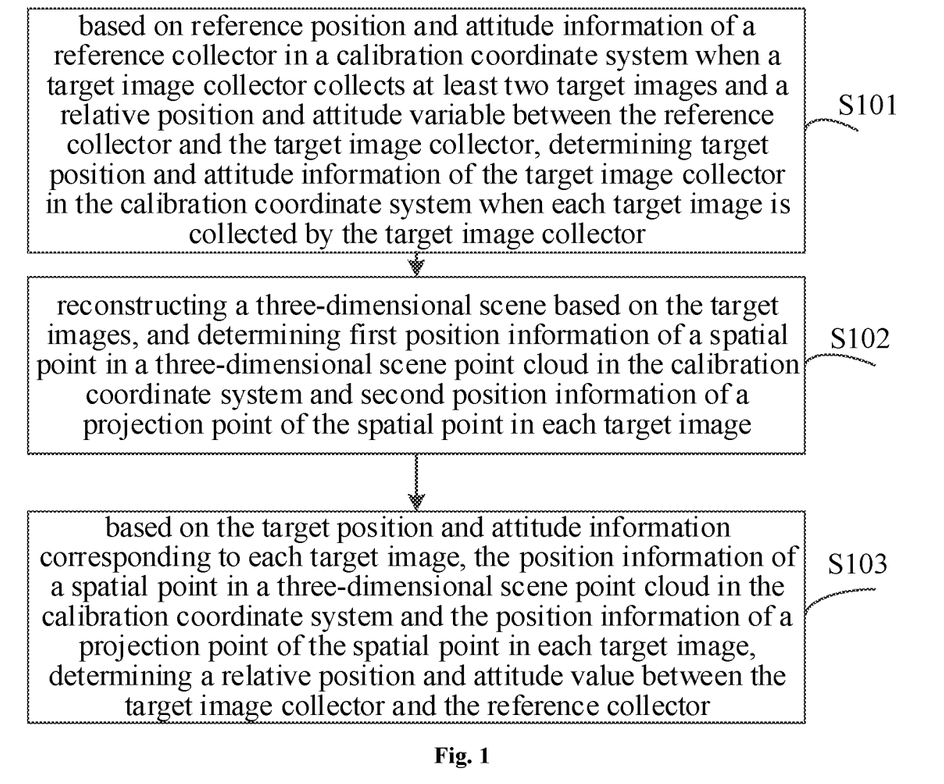
FIG. 1 is a flow chart of a method for calibrating relative parameters of a collector according to a first embodiment of the present disclosure.

FIG. 1 is a flow chart of a method for calibrating relative parameters of a collector according to the first embodiment of the present disclosure. This embodiment can be applied in a calibration of outer parameters of several camera having non-overlapping field of view, for example in a scene for calibrating a relative position and attitude value of several cameras. The method in this embodiment can be performed by an apparatus for calibrating relative parameters of a collector. The apparatus may be implemented by hardware and/or software, and integrated in any electronic device having network communication function.

As illustrated in FIG. 1, the method may include the following.

At block S101, based on reference position and attitude information of a reference collector in a calibration coordinate system when a target image collector collects at least two target images and a relative position and attitude variable between the reference collector and the target image collector, target position and attitude information of the target image collector in the calibration coordinate system when each target image is collected by the target image collector is determined.

In this embodiment, the target image collector can be used to collect images from a scene to obtain at least two target images. Accordingly, the reference position and attitude information of the reference collector in the calibration coordinate system when one of the at least two target images is collected by the target image collector can be determined. When the target image collector collects one target image, the reference position and attitude information of the reference collector in the calibration coordinate system at the time point when the target image collector collects the target image can be determined accordingly. The position and attitude information can include position information and attitude information. The position information may be represented by a translation matrix T, and the attitude information may be represented by a rotation matrix R. The position and attitude information may refer to six degrees of freedom, the parameters thereof may be respectively represented as X, Y, Z, $\alpha$, $\beta$ and $\gamma$. The target image collector may be a camera, for example, a still camera or a video camera. The reference collector may be a camera, for example, a still camera or a video camera, or may be an inertial navigation device. Alternatively, if the inertial navigation device exists in a multi-camera system, then the inertial navigation device in the multi-camera system can be configured as the reference collector and the cameras in the multi-camera system can be repetitively configured as the target image collector. If no inertial navigation device exists in a multi-camera system, then any camera can be selected from the multi-camera system as the reference collector and the remaining cameras in the multi-camera system can be repetitively configured as the target image collector.

In this embodiment, in order to determine the relative position and attitude value between the reference collector and the target image collector, a relative position and attitude variable between the reference collector and the target image collector can be set as an initial relative position and attitude variable based on a relative relation between the reference collector and the target image collector, i.e., a relative position and attitude variation between the reference collector and the target image collector is set in advance. It should be noted that, the initial relative position and attitude variable is an inaccurate relative parameter. The preset relative position and attitude variable is optimized continuously using a technical solution of calibrating relative parameters of a collector according to embodiments of the present disclosure to obtain a final relative position and attitude value between the target image collector and the reference collector, thus realizing a process of calibrating relative parameters of a collector.

In this embodiment, the target image collector may collect many target images, and correspondingly may include the reference position and attitude information of several reference collectors in the calibration coordinate system. For ease of explanation, exemplary description may be made by taking the reference position and attitude information of the reference collector in the calibration coordinate system when any target image is collected by the target image collector as an example in the following. Exemplarily, assuming that the reference position and attitude information of the reference collector in the calibration coordinate system when the target image collector collects the $j^{th}$ target image is configured as $T_j^G$ and the relative position and attitude variable between the reference collector and the target image collector is configured as $T_G^C$, the $j^{th}$ target position and attitude information $T_j^C$ of the target image collector in the calibration coordinate system when the target image collector collects the $j^{th}$ target image can be acquired based on $T_j^G$ and $T_G^C$. In other words, after determining the reference position and attitude information of the reference collector in the calibration coordinate system, the target position and attitude information of the target image collector in the calibration coordinate system can be determined on basis of the relative relation between the reference collector and the target image collector. Based on the way of calculating the $j^{th}$ target position and attitude information $T_j^C$ of the target image collector in the calibration coordinate system when the target image collector collects the $j^{th}$ target image, a set of target position and attitude information of the target image collector in the calibration coordinate system when the target image collector collects each target image can be acquired.

At block S102, a three-dimensional scene is reconstructed based on the target images, and first position information of a spatial point in a three-dimensional scene point cloud in the calibration coordinate system and second position information of a projection point of the spatial point in each target image are determined.

In detail, the three-dimensional scene may be reconstructed using a three-dimensional scene reconstruction algorithm such as Scale-Invariant Feature Transform (SIFT) algorithm, based on each collected target image, so as to obtain a three-dimensional scene model.

In an alternative implementation of this embodiment, reconstructing the three-dimensional scene based on the target images and determining the first position information of a spatial point in a three-dimensional scene point cloud in the calibration coordinate system and the second position information of a projection point of the spatial point in each target image may be implemented as follows.

At block S1021, the second position information of a projection point of the spatial point in each target image is determined by performing a feature point matching on each target image collected by the target image collector at distinct time point.

At block S1022, the three-dimensional scene is reconstructed based on a relative position and attitude value of the target image collector at the time point when each target image is collected and the second position information, and the first position information of the spatial point in the calibration coordinate system is determined.

In this embodiment, for each target image collected by the target image collector, a feature point extraction is performed on the target image to obtain at least one feature point of this target image. The feature point may refer to a pixel point having distinctive characteristic and reflecting substitutive characteristics of the target image. For example, the feature point may be the pixel point at a corner, texture and edge of the target image. The feature point may have the distinctive characteristic and may effectively reflect substitutive characteristics of the target image, such that the pixel points of the target object in the target image may be identified. Based on the above operations, at least one feature point of each target image collected by the target image collector at distinct time point may be extracted respectively. Therefore, by performing the feature point matching on each target image collected by the target image collector at distinct time point, the position information of the projection point of the spatial point in the three-dimensional scene point cloud in each target image can be determined. The spatial point in the three-dimensional scene may refer to an actual position of the feature point of the target image in the calibration coordinate system. For example, the spatial point in the three-dimensional scene may be an actual coordinate position of the feature point in a word coordinate system or a local coordinate system.

In this embodiment, alternatively, in the case that the target images subject to the feature point matching have significant difference, in view of the characteristic that the Scale-Invariant Feature Transform (SIFT) algorithm has good robustness in rotation, scale and perspectivity, the SIFT algorithm may be used to extract the feature points of each collected target image. In the case that the target images subject to the feature point matching have small difference, in view of the characteristic that the Speed Up Robust Feature (SURF) algorithm and the Oriented Fast and Rotated BRIEF (ORB) algorithm have a fast speed, the SURF algorithm and the ORB algorithm may be used to extract the feature points of each collected target image. Certainly, the method of extracting feature points of the target images includes, but is not limited to the SIFT algorithm, the SURE algorithm and the ORB algorithm.

In this embodiment, according to a 2D-2D camera position and attitude estimating principle, a relative movement of the target image collector in the space under its own coordinate system may be acquired on basis of the feature points of two target images collected by the target image collector (such as camera). In addition, the target image collector may collect the target images at different time points, and extract at least one feature point from the target images. Based on the above principle, after extracting the feature points of any two target images collected by the target image collector, the 2D-2D camera position and attitude estimating principle may be used to perform the feature point matching on the two target images, so as to determine the relative movement of the target image collector and estimate relative rotation information and relative position information of the target image collector, i.e., acquiring the relative position and attitude value of the target image collector at the time point when each target image is collected. For example, taking a position where the target image collector collects a first frame of image as a reference position, based on a result of the feature point matching performed on the first frame of image and the second frame of image collected by the target image collector, the relative position and attitude value of the target image collector at the time point when the second frame of image is collected by the target image collector, i.e. the relative position and attitude value of the target image collector in the space under its own coordinate system, may be acquired. According to a triangularization principle, the three-dimensional scene point cloud may be reconstructed on basis of the relative position and attitude value of the target image collector at the time point when each target image is collected and the position information of the projection point of the spatial point in each target image, and the position information of the spatial point in the calibration coordinate system may be determined according to the result of reconstructing the three-dimensional scene. The spatial point in the three-dimensional scene may refer to the actual position of the feature point of the target image under the calibration coordinate system.

At block S103, based on the target position and attitude information corresponding to each target image, the position information of a spatial point in a three-dimensional scene point cloud in the calibration coordinate system and the position information of a projection point of the spatial point in each target image, a relative position and attitude value between the target image collector and the reference collector is determined.

In an alternative implementation of this embodiment, after determining the relative position and attitude value between the target image collector and the reference collected, the method may further include: based on the relative position and attitude values between the reference collected and different target image collectors, the relative position and attitude value between the different target image collectors can be acquired.

In this embodiment, the position and attitude value includes position information and an attitude information. The position information may be represented by a translation matrix T and the attitude information may be represented by a rotation matrix R. The position and attitude information may refer to six degrees of freedom, the parameters thereof may be respectively represented as X, Y, Z, $\alpha$, $\beta$ and $\gamma$. Taking the reference collector O, the target image collector A and the target image collector B as an example, wherein the first relative position and attitude value between the reference collector O and the target image collector A is ($X_1$, $Y_1$, $Z_1$, $\alpha_1$, $\beta_1$, $\gamma_1$), the second position and attitude value between the reference collector O and the target image collector B is ($X_2$, $Y_2$, $Z_2$, $\alpha_2$, $\beta_2$, $\gamma_2$), a vector computing can be performed on the first position and attitude value ($X_1$, $Y_1$, $Z_1$, $\alpha_1$, $\beta_1$, $\gamma_1$) and the second position and attitude value ($X_2$, $Y_2$, $Z_2$, $\alpha_2$, $\beta_2$, $\gamma_2$) to acquire the third position and attitude value ($X_3$, $Y_3$, $Z_3$, $\alpha_3$, $\beta_3$, $\gamma_3$) between the target image collector A and the target image collector B. Of course, there may be a plurality of target image collectors, i.e., it is not limited to the target image collector A and the target image collector B. The relative position and attitude value between different target image collectors can be acquired with reference to the above way of computing the third position and attitude value between the target image collector A and the target image collector B.

The embodiments of the present disclosure provide a method for calibrating relative parameters of a collector, including: determining, based on reference position and attitude information of a reference collector in a calibration coordinate system when a target image collector collects at least two target images and a relative position and attitude variable between the reference collector and the target image collector, target position and attitude information of the target image collector in the calibration coordinate system when each target image is collected by the target image collector; reconstructing, based on the target images, a three-dimensional scene, and determining first position information of a spatial point in a three-dimensional scene point cloud in the calibration coordinate system and second position information of a projection point of the spatial point in each target image; and determining, based on the target position and attitude information corresponding to each target image, the first position information and the second position information, a first relative position and attitude value between the target image collector and the reference collector. The technical solution of the present disclosure provides a new method for calibrating a relative position and attitude value, which may realize the calibration of outer parameters of several cameras having non-overlapping field of view without setting a calibration object in the scene, thus improving convenience of the calibration of outer parameters of several cameras.

Second Embodiment

Figure 2:
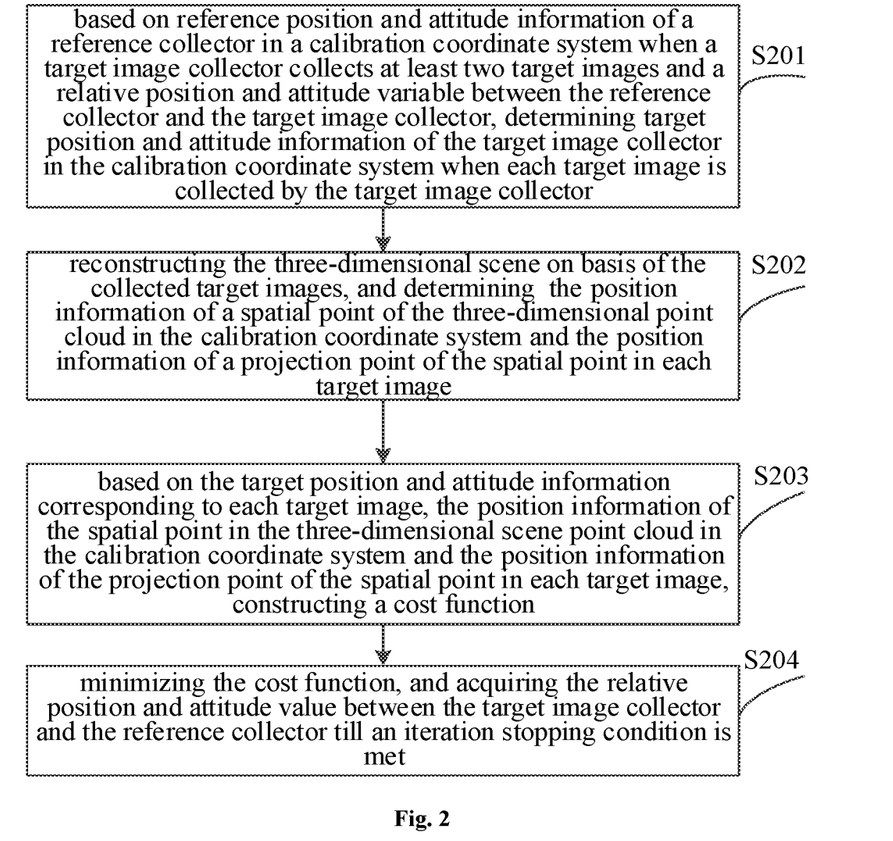
FIG. 2 is a flow chart of a method for calibrating relative parameters of a collector according to a second embodiment of the present disclosure.

FIG. 2 is a flow chart of a method for calibrating relative parameters of a collector according to the second embodiment of the present disclosure. This embodiment is obtained by optimizing the above embodiments, which may be combined with one or more aforementioned embodiments.

As illustrated in FIG. 2, the method for calibrating relative parameters of a collector includes the following.

At block S201, based on reference position and attitude information of a reference collector in a calibration coordinate system when a target image collector collects at least two target images and a relative position and attitude variable between the reference collector and the target image collector, target position and attitude information of the target image collector in the calibration coordinate system when each target image is collected by the target image collector is determined.

In an alternative implementation of the embodiment, when the reference collector is an inertial navigation device, the position and attitude information of the inertial navigation device in the word coordinate system collected by the inertial navigation device can be directly read from the inertial navigation device as the reference position and attitude information of the reference collector in the calibration coordinate system when the target image collector collects at least two target images.

In general, the position and attitude information of the inertial navigation device in the word coordinate system can be directly read by the inertial navigation device as the reference position and attitude information of the reference collector in the calibration coordinate system, but the reference image collector cannot directly read the position and attitude information of the reference image collector in the word coordinate system.

In an alternative implementation of the embodiment, when a reference image collector (for example, the reference image collector is a camera) rather than the inertial navigation device is adopted as the reference collector, then the position and attitude information of the reference collector in the calibration coordinate system when the target image collector collects at least two target images may be determined by following operations a1-a3.

a1, each reference image collected by the reference collector when the target image collector collects at least two target images is acquired.

a2, one reference image is selected from the reference images as a reference calibration image and a coordinate system of the reference collector when the reference calibration image is collected is determined as the calibration coordinate system.

In this implementation, the target image collector may be configured to collect images in the scene to obtain at least two target images. When the target image collector collects the target image, the reference collector may collect the reference image synchronously. To this, each reference image collected by the reference collector when the target image collector collects at least two target images is acquired firstly. Any one of the reference images collected by the reference collector is selected as the reference calibration image and the coordinate system of the reference collector when the reference calibration image is collected is determined as the calibration coordinate system.

a3, a relative position and attitude value between another reference coordinate system corresponding to a time point when another reference image is collected and the calibration coordinate system is determined as the reference position and attitude information of the reference collector in the calibration coordinate system when the another reference image is collected.

In this implementation, after determining the reference calibration image, the calibration coordinate system and another reference image (there may be many reference images each of which can be configured as another reference image), a coordinate system of the reference collector when another reference image is collected is determined as another reference coordinate system. Another reference image can be understood as a reference image other than the reference calibration image in the reference images collected by the reference collector. Further, based on the calibration coordinate system and another reference coordinate system, the relative position and attitude value between the calibration coordinate system and the another reference coordinate system can be determined, and the determined relative position and attitude value can be configured as the reference position and attitude information of the reference collector in the calibration coordinate system when the another reference image is collected, such that the reference position and attitude information of the reference collector in the calibration coordinate system when the target image collector collects the at least two target images is determined.

In this implementation, the relative position and attitude value between the calibration coordinate system and another reference coordinate system when another reference image is collected can be determined through following operations a31-a34.

a31, based on a first feature point matching result between a first another reference image and the reference calibration image, a first relative reference position and attitude value between a first another reference coordinate system and the calibration coordinate system is determined.

a32, based on the first feature point matching result, the first relative reference position and attitude value and an inner parameter of the reference image collector, a reference scene point cloud is constructed.

a33, based on a second feature point matching result between a second another reference image and the reference scene point cloud, a second relative reference position and attitude value between a second another reference coordinate system and the calibration coordinate system is determined, and the reference scene point cloud is updated.

a34, the second another reference image is determined as a new first another reference image and a new second another reference image is determined, and it is returned to perform determining, based on the first feature point matching result between the first another reference image and the reference calibration image, the first relative reference position and attitude value between the first another reference coordinate system and the calibration coordinate system.

In more details, during the above operations a31-a34, the operations a1 and a2 can be used to determine the reference calibration image, the calibration coordinate system and a plurality of another reference images. Considering that the reference image collector collects the reference image at a quick frequency and a part of contents in two adjacent frames of image collected by the reference image collector are the same, feature points corresponding respectively to the two adjacent frames of image have corresponding relation. According to a 2D-2D camera position and attitude estimating principle, the corresponding relation between feature points of the first another reference image and the reference calibration image is acquired by performing the feature point matching on the corresponding feature points of the first another reference image and the reference calibration image. On basis of the first feature point matching result between the first another reference image and the reference calibration image, a relative movement between the first another reference image and the reference calibration image may be determined, and the reference relative position and attitude value between the coordinate system of the reference image collector when collecting the first another reference image and the coordinate system of the reference image collector when collecting the reference calibration image can be acquired, i.e., acquiring the reference relative position and attitude value between the first another reference coordinate system and the calibration coordinate system.

In detail, according to a triangularization principle, the reference scene point cloud may be constructed on basis of the feature point matching result between the reference calibration image and the first another reference image, the reference relative position and attitude value and the inner parameter of the reference image collector. The position information of the feature points of the reference calibration image and the first another reference image in a three-dimensional actual scene can be determined through the reference scene point cloud. After the reference scene point cloud is constructed and the second another reference image is collected, according to 3D-2D camera position and attitude estimating principle, the feature point matching can be performed on the feature points of the reference scene point cloud and the second another reference image. Further, based on the feature point matching result between the reference scene point cloud and the second another reference image, the reference relative position and attitude value between the coordinate system of the reference image collector when collecting the second another reference image and the coordinate system of the reference image collector when collecting the reference calibration image can be acquired, i.e., determining the reference relative position and attitude value between the second another reference coordinate system and the calibration coordinate system, simultaneously the reference scene point cloud is updated.

It should be understood that, during the operations a31-a34, there may be unqualified feature point in the corresponding relation of feature points between two adjacent frames of reference image of the first another reference image and the reference calibration image, for example, in two adjacent frames of image, there is a feature point of one frame of image not existing in the other frame of image. When the feature point matching is performed on the first another reference image and the reference calibration image, an abnormal corresponding relation may be acquired, and unqualified feature points in the two adjacent frames of image can be removed. Further, the reference image collector may collect the reference images at different time points, the feature point matching is performed at all the time points and between the reference images collected by the reference image collector.

At block S202, the three-dimensional scene is reconstructed on basis of the collected target images, and the position information of a spatial point of the three-dimensional point cloud in the calibration coordinate system and the position information of a projection point of the spatial point in each target image are determined.

In this embodiment, reconstructing the three-dimensional scene based on the target images and determining the position information of the spatial point in the three-dimensional scene point cloud in the calibration coordinate system and the position information of the projection point of the spatial point in each target image may include: determining the position information of the projection point of the spatial point in each target image by performing a feature point matching on each target image collected by the target image collector at distinct time point; and reconstructing the three-dimensional scene based on a relative position and attitude value of the target image collector at a time point when each target image is collected and the position information of the projection point of the spatial point in each target image, and determining the position information of the spatial point in the three-dimensional scene point cloud in the calibration coordinate system.

At block S203, based on the target position and attitude information corresponding to each target image, the position information of the spatial point in the three-dimensional scene point cloud in the calibration coordinate system and the position information of the projection point of the spatial point in each target image, a cost function is constructed.

In this embodiment, the steps at block S203 and block S204 can be acquired by optimizing the step at block S103 in the first embodiment. Alternatively, based on the target position and attitude information corresponding to each target image, the position information of the spatial point in the three-dimensional scene point cloud in the calibration coordinate system and the position information of the projection point of the spatial point in each target image, the cost function can be constructed as $F=\Sigma \|\text{Proj}(X_i, T_j^G T_G^C) - M_{ij}\|$.

Proj refers to projecting the spatial point i in the three-dimensional scene point cloud to the target image j; $X_i$ refers to the position information of the spatial point i in the calibration coordinate system; $T_j^G T_G^C$ refers to the target position and attitude information of the target image collector C in the calibration coordinate system when the target image j is collected by the target image collector C; $T_j^G$ refers to the reference position and attitude information of the reference collector in the calibration coordinate system when the target image collector C collects the target image j; $T_G^C$ refers to the relative position and attitude value between the reference collector and the target image collector; $M_{ij}$ refers to the position information of the projection point of the spatial point i in the target image j.

In this embodiment, $T_j^G T_G^C$ may represent the target position and attitude information of the target image collector C in the calibration coordinate system when the target image collector C collects the $j^{th}$ target image. When the reference collector is an inertial navigation device, the calibration coordinate system may be a word coordinate system. When the reference collector is a reference image collector, the calibration coordinate system may be a local coordinate system. For example, referring to operation a2, a reference image is selected from the reference images as the reference calibration image, and the coordinate system of the reference collector at a time point when the reference calibration image is collected is determined as the calibration coordinate system. In this case, the coordinate system of the reference collector at a time point when the reference collector collects the reference calibration image is configured as the calibration coordinate system.

In this embodiment, when the reference collector is an inertial navigation device, $T_j^G$ may represent the reference position and attitude information of the reference collector under the word coordinate system when the target image collector collects the target image j. When the reference collector is a reference image collector, for example a camera, $T_j^G$ may represent the reference position and attitude information of the reference collector under the local coordinate system when the target image collector collects the target image j.

At block S204, the cost function is minimized, and the relative position and attitude value between the target image collector and the reference collector is acquired till an iteration stopping condition is met.

In this embodiment, $T_G^C$ can be understood as the relative position and attitude value between the target image collector and the reference collector. The initial relative position and attitude variable is an inaccurate relative parameter. By minimizing the cost function according to the embodiment, the relative position and attitude value $T_G^C$ between the target image collector and the reference collector can be optimized constantly. When an iteration stopping condition is met, it indicates that an optimized relative position and attitude value $T_G^C$ between the target image collector and the reference collector is obtained.

Third Embodiment

Figure 3:
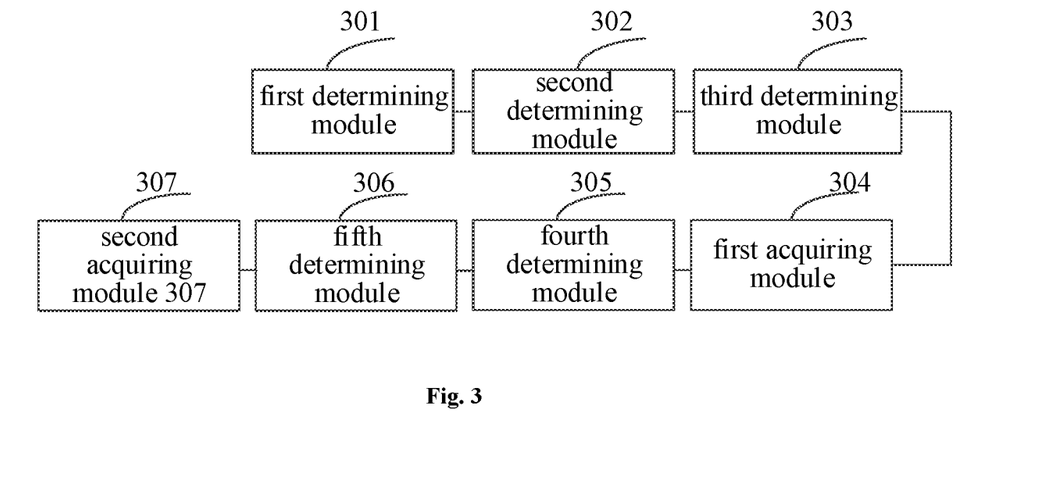
FIG. 3 is a block diagram of an apparatus for calibrating relative parameters of a collector according to a third embodiment of the present disclosure.

FIG. 3 is a block diagram of an apparatus for calibrating relative parameters of a collector according to the embodiment of the present disclosure. This embodiment can be applied in a calibration of outer parameters of several camera having non-overlapping field of view, for example in a scene for calibrating a relative position and attitude value of several cameras. The apparatus may be implemented by hardware and/or software, and integrated in any electronic device having network communication function.

As illustrated in FIG. 3, the apparatus may include a first determining module 301, a second determining module 302 and a third determining module 303.

The first determining module 301 is configured to determine, based on reference position and attitude information of a reference collector in a calibration coordinate system when a target image collector collects at least two target images and a relative position and attitude variable between the reference collector and the target image collector, target position and attitude information of the target image collector in the calibration coordinate system when each target image is collected by the target image collector.

The second determining module 302 is configured to reconstruct, based on the target images, a three-dimensional scene, and determine first position information of a spatial point in a three-dimensional scene point cloud in the calibration coordinate system and second position information of a projection point of the spatial point in each target image.

The third determining module 303 is configured to determine, based on the target position and attitude information corresponding to each target image, the first position information and the second position information, a first relative position and attitude value between the target image collector and the reference collector.

In an alternative implementation of this embodiment, the second determining module 302 may include a first determining unit and a second determining unit.

The determining unit is configured to determine the second position information by performing a feature point matching on each target image collected by the target image collector at distinct time point.

The second determining unit is configured to: reconstruct, based on a second relative position and attitude value of the target image collector at a first time point when a target image is collected and the second position information, the three-dimensional scene, and determine the first position information.

In an alternative implementation of this embodiment, the third determining module 303 may include a first constructing unit and a third determining unit.

The first constructing unit is configured to construct, based on the target position and attitude information corresponding to each target image, the first position information and the second position information, a cost function; and The third determining unit is configured to minimize the cost function and acquire the first relative position and attitude value between the target image collector and the reference collector till an iteration stopping condition is met.

The constructing unit is configured to construct the cost function as $F=\Sigma \|\text{Proj}(X_i, T_j^G T_G^C) - M_{ij}\|$.

Proj refers to projecting the spatial point i in the three-dimensional scene point cloud to the target image j; $X_i$ refers to the first position information of the spatial point i in the calibration coordinate system; $T_j^G T_G^C$ refers to the target position and attitude information of the target image collector C in the calibration coordinate system when the target image j is collected by the target image collector C; $T_j^G$ refers to the reference position and attitude information of the reference collector in the calibration coordinate system when the target image collector C collects the target image j; $T_G^C$ refers to the first relative position and attitude value between the reference collector and the target image collector C; $M_{ij}$ refers to the second position information of the projection point of the spatial point i in the target image j.

In an alternative implementation of this embodiment, when the reference collector is a reference image collector, the apparatus may further include a first acquiring module 304, a fourth determining module 305 and a fifth determining module 306.

The first acquiring module 304 is configured to acquire each reference image collected by the reference collector when the target image collector collects at least two target images.

The fourth determining module 305 is configured to select a reference image as a reference calibration image and determine a coordinate system of the reference collector when the reference calibration image is collected as the calibration coordinate system.

The fifth determining module 306 is configured to determine a third relative position and attitude value between another reference coordinate system corresponding to a second time point when another reference image is collected and the calibration coordinate system as the reference position and attitude information of the reference collector in the calibration coordinate system at the second time point.

In an alternative implementation of this embodiment, the fifth determining module 306 may include a fourth determining unit, a second constructing unit, an updating unit and a processing unit.

The fourth determining unit is configured to determine, based on a first feature point matching result between a first another reference image and the reference calibration image, a first relative reference position and attitude value between a first another reference coordinate system and the calibration coordinate system.

The second constructing unit is configured to construct, based on the first feature point matching result, the first relative reference position and attitude value and an inner parameter of the reference image collector, a reference scene point cloud.

The updating unit is configured to determine, based on a second feature point matching result between a second another reference image and the reference scene point cloud, a second relative reference position and attitude value between a second another reference coordinate system and the calibration coordinate system, and update the reference scene point cloud.

The processing unit is configured to determine the second another reference image as a new first another reference image, determine a new second another reference image and return to perform determining, based on the first feature point matching result between the first another reference image and the reference calibration image, the first relative reference position and attitude value between the first another reference coordinate system and the calibration coordinate system.

In an alternative implementation of this embodiment, the apparatus may further include a second acquiring module 307, configured to acquire, based on the first relative position and attitude value between the reference collector and each target image collector, a fourth relative position and attitude value between different target image collectors.

The apparatus for calibrating relative parameters of a collector according to this embodiment may perform the method for calibrating relative parameters of a collector according to any of the above mentioned embodiments, and has corresponding functional modules for perform the method and technical effects.

Fourth Embodiment

Figure 4:
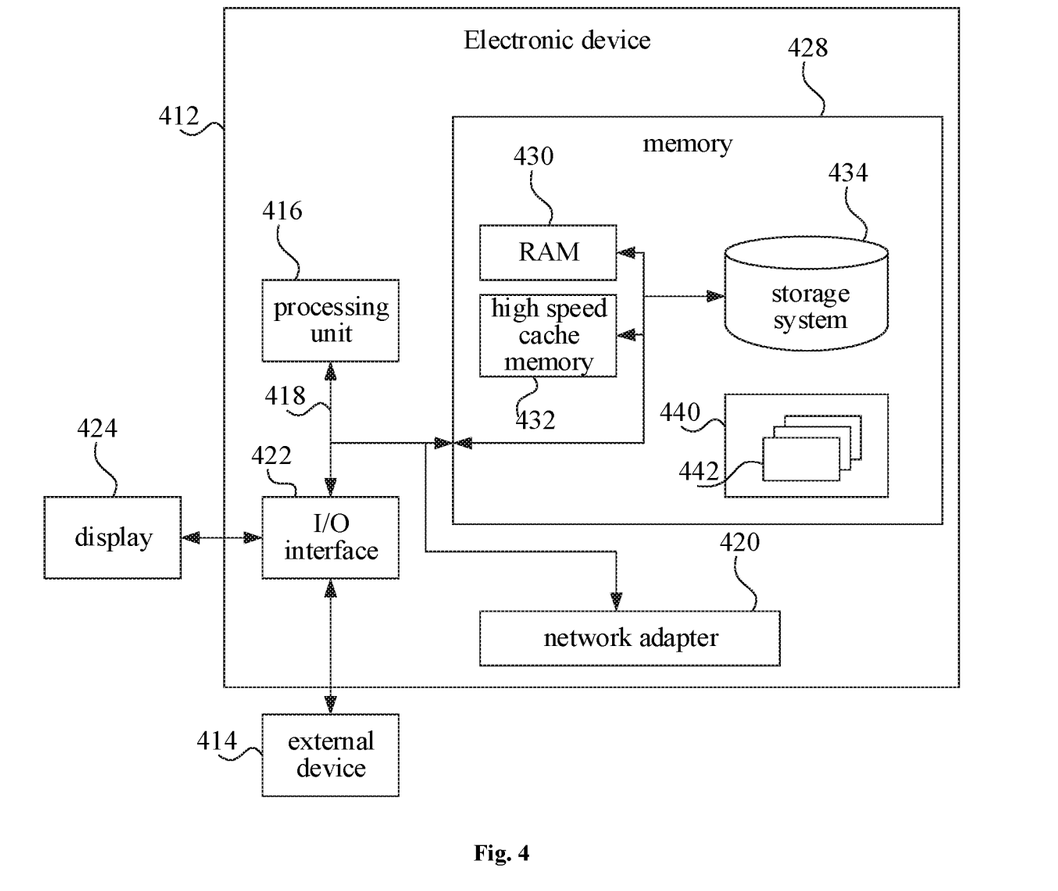
FIG. 4 is a schematic diagram of an electronic device according to a fourth embodiment of the present disclosure.

FIG. 4 is a block diagram of an electronic device according to the fourth embodiment of the present disclosure. FIG. 4 illustrates a block diagram of an example electronic device 412 adapted to implement embodiments of the present disclosure. The electronic device 412 illustrated in FIG. 4 is merely an example, and cannot be interpreted as a limitation on the function and application scope of the embodiments of the present disclosure.

As illustrated in FIG. 4, components of the electronic device 412 may include, but is not limited to, one or more processors or processing units 416, a memory 428, a bus 418 connected to various system components, such as the memory 428, the processor 416.

The bus 418 represents one or more of any of several types of bus structures, including a memory bus or a memory controller, a peripheral bus, an accelerated graphics port, a processor 16, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The electronic device 412 typically includes a variety of computer system readable media. These media may be any available media accessible by the electronic device 12 and includes both volatile and non-volatile media, removable and non-removable media.

The memory 428 may include a computer system readable medium in the form of volatile memory, such as a random access memory (hereinafter referred to as RAM) 430 and/or a high speed cache memory 432. The electronic device 412 may further include other removable or non-removable, volatile or non-volatile computer system storage media. By way of example only, the storage system 434 may be configured to read and write a non-removable and non-volatile magnetic media (not shown in FIG. 4, commonly referred to as a "hard drive"). Although not shown in FIG. 4, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), Digital Video Disc Read Only Memory (hereinafter referred to as DVD-ROM) or other optical media can be provided. In these cases, each driver may be connected to the bus 418 via one or more data medium interfaces. The memory 428 may include at least one program product. The program product has a set (such as, at least one) of program modules configured to perform the functions of various embodiments of the present disclosure.

A program/utility 440 having a set (at least one) of the program modules 442 may be stored in, for example, the memory 428. The program modules 442 include but are not limited to, an operating system, one or more application programs, other programs modules, and program data. Each of these examples, or some combination thereof, may include an implementation of a network environment. The program modules 442 generally perform the functions and/or methods in the embodiments described herein.

The electronic device 412 may also communicate with one or more external devices 414 (such as, a keyboard, a pointing device, a display 424, etc.). Furthermore, the electronic device 412 may also communicate with one or more devices enabling a user to interact with the electronic device 412 and/or other devices (such as a network card, modem, etc.) enabling the electronic device 412 to communicate with one or more computer devices. This communication can be performed via the input/output (I/O) interface 422. Also, the electronic device 412 may communicate with one or more networks (such as a local area network (hereafter referred to as LAN), a wide area network (hereafter referred to as WAN) and/or a public network such as an Internet) through a network adapter 420. As shown in FIG. 4, the network adapter 420 communicates with other modules of the electronic device 412 over the bus 418. It should be understood that, although not shown in FIG. 4, other hardware and/or software modules may be used in conjunction with the electronic device 412. The hardware and/or software includes, but is not limited to, microcode, device drivers, redundant processing units, external disk drive arrays, RAID systems, tape drive and data backup storage system.

The processing unit 416 is configured to execute various functional applications and data processing by running programs stored in the memory 428, for example, implementing the method for calibrating relative parameters of a collector provided in embodiments of the present disclosure, the method includes: determining, based on reference position and attitude information of a reference collector in a calibration coordinate system when a target image collector collects at least two target images and a relative position and attitude variable between the reference collector and the target image collector, target position and attitude information of the target image collector in the calibration coordinate system when each target image is collected by the target image collector; reconstructing, based on the target images, a three-dimensional scene, and determining first position information of a spatial point in a three-dimensional scene point cloud in the calibration coordinate system and second position information of a projection point of the spatial point in each target image; and determining, based on the target position and attitude information corresponding to each target image, the first position information and the second position information, a first relative position and attitude value between the target image collector and the reference collector.

Fifth Embodiment

The fifth embodiment further provides a storage medium containing instructions executable by a computer. When the instructions are executed by a processor of the computer, the method for calibrating relative parameters of a collector according to any embodiment of the present disclosure is performed. The method includes: determining, based on reference position and attitude information of a reference collector in a calibration coordinate system when a target image collector collects at least two target images and a relative position and attitude variable between the reference collector and the target image collector, target position and attitude information of the target image collector in the calibration coordinate system when each target image is collected by the target image collector; reconstructing, based on the target images, a three-dimensional scene, and determining first position information of a spatial point in a three-dimensional scene point cloud in the calibration coordinate system and second position information of a projection point of the spatial point in each target image; and determining, based on the target position and attitude information corresponding to each target image, the first position information and the second position information, a first relative position and attitude value between the target image collector and the reference collector.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It should be noted that the above description is merely preferred embodiments and technical principles of the present disclosure. It should be understood that the present disclosure is not limited to the specific embodiments described above. Those skilled in the art may make changes, alternatives, and modifications in the embodiments without departing from spirit, principles and scope of the present disclosure. Although explanatory embodiments have been shown and described, it would be appreciated by those skilled in the art that the above embodiments cannot be construed to limit the present disclosure, and the present disclosure may further include other equivalent embodiments without departing from spirit of the present disclosure. The scope of present disclosure is determined by the accompanying claims.

What is claimed is:

1. A method for calibrating relative parameters of a collector, comprising:
   determining, based on reference position and attitude information of a reference collector in a calibration coordinate system when a target image collector collects at least two target images and a relative position and attitude variable between the reference collector and the target image collector, target position and attitude information of the target image collector in the calibration coordinate system when each target image is collected by the target image collector;
   reconstructing, based on the target images, a three-dimensional scene, and determining first position information of a spatial point in a three-dimensional scene point cloud in the calibration coordinate system and second position information of a projection point of the spatial point in each target image; and
   determining, based on the target position and attitude information corresponding to each target image, the first position information and the second position information, a first relative position and attitude value between the target image collector and the reference collector;
   wherein, determining, based on the target position and attitude information corresponding to each target image, the first position information and the second position information, the first relative position and attitude value between the target image collector and the reference collector comprises:
   constructing, based on the target position and attitude information corresponding to each target image, the first position information and the second position information, a cost function; and
   minimizing the cost function and acquiring the first relative position and attitude value between the target image collector and the reference collector till an iteration stopping condition is met;
   wherein, constructing, based on the target position and attitude information corresponding to each target image, the first position information and the second position information, the cost function comprises:
   constructing the cost function as $F=\Sigma\|Proj(X_i, T_j^G T_G^C)-M_{ij}\|$;
   where Proj refers to projecting the spatial point i in the three-dimensional scene point cloud to the target image j; $X_i$ refers to the first position information of the spatial point i in the calibration coordinate system; $T_j^G T_G^C$ refers to the target position and attitude information of the target image collector C in the calibration coordinate system when the target image j is collected by the target image collector C; $T_j^G$ refers to the reference position and attitude information of the reference collector in the calibration coordinate system when the target image collector C collects the target image j; $T_G^C$ refers to the first relative position and attitude value; $M_{ij}$ refers to the second position information of the projection point of the spatial point i in the target image j.

2. The method of claim 1, wherein reconstructing, based on the target images, the three-dimensional scene, and determining the first position information of the spatial point in the three-dimensional scene point cloud in the calibration coordinate system and the second position information of the projection point of the spatial point in each target image comprises:
   determining the second position information by performing a feature point matching on each target image collected by the target image collector at distinct time point; and
   reconstructing, based on a second relative position and attitude value of the target image collector at a first time point when each target image is collected and the second position information, the three-dimensional scene, and determining the first position information.

3. The method of claim 1 wherein, when the reference collector is a reference image collector, the reference position and attitude information of the reference collector in the calibration coordinate system when the target image collector collects at least two target images is determined by:
   acquiring each reference image collected by the reference collector when the target image collector collects at least two target images;
   selecting a reference image as a reference calibration image and determining a coordinate system of the reference collector when the reference calibration image is collected as the calibration coordinate system; and
   determining a third relative position and attitude value between another reference coordinate system corresponding to a second time point when another reference image is collected and the calibration coordinate system as the reference position and attitude information of the reference collector in the calibration coordinate system at the second time point.

4. The method of claim 3, wherein determining the third relative position and attitude value between another reference coordinate system corresponding to the second time point when another reference image is collected and the calibration coordinate system comprises:
   determining, based on a first feature point matching result between a first reference image and the reference calibration image, a first relative reference position and attitude value between a first reference coordinate system and the calibration coordinate system;
   constructing, based on the first feature point matching result, the first relative reference position and attitude value and an inner parameter of the reference image collector, a reference scene point cloud;
   determining, based on a second feature point matching result between a second reference image and the reference scene point cloud, a second relative reference position and attitude value between a second reference coordinate system and the calibration coordinate system, and updating the reference scene point cloud; and
   determining the second reference image as a new first reference image, determining a new second reference image and returning to perform determining, based on the first feature point matching result between the first reference image and the reference calibration image, the first relative reference position and attitude value between the first reference coordinate system and the calibration coordinate system.

5. The method of claim 1, wherein, after determining the first relative position and attitude value between the target image collector and the reference collector, the method further comprises:
  acquiring, based on the first relative position and attitude value between the reference collector and each target image collector, a fourth relative position and attitude value between different target image collectors.

6. An electronic device comprising:
  one or more processors;
  a memory for storing one or more programs;
  wherein when the one or more programs are executed by the one or more processors, the one or more processors are caused to perform the method for calibrating relative parameters of a collector comprising:
  determining, based on reference position and attitude information of a reference collector in a calibration coordinate system when a target image collector collects at least two target images and a relative position and attitude variable between the reference collector and the target image collector, target position and attitude information of the target image collector in the calibration coordinate system when each target image is collected by the target image collector;
  reconstructing, based on the target images, a three-dimensional scene, and determining first position information of a spatial point in a three-dimensional scene point cloud in the calibration coordinate system and second position information of a projection point of the spatial point in each target image; and
  determining, based on the target position and attitude information corresponding to each target image, the first position information and the second position information, a first relative position and attitude value between the target image collector and the reference collector;
  wherein, determining, based on the target position and attitude information corresponding to each target image, the first position information and the second position information, the first relative position and attitude value between the target image collector and the reference collector comprises:
  constructing, based on the target position and attitude information corresponding to each target image, the first position information and the second position information, a cost function; and
  minimizing the cost function and acquiring the first relative position and attitude value between the target image collector and the reference collector till an iteration stopping condition is met;
  wherein, constructing, based on the target position and attitude information corresponding to each target image, the first position information and the second position information, the cost function comprises:
  constructing the cost function as $F=\Sigma \|\text{Proj}(X_i, T_j^G T_G^C) - M_{ij}\|$;
  where Proj refers to projecting the spatial point i in the three-dimensional scene point cloud to the target image j; $X_i$ refers to the first position information of the spatial point i in the calibration coordinate system; $T_j^G T_G^C$ refers to the target position and attitude information of the target image collector C in the calibration coordinate system when the target image j is collected by the target image collector C; $T_j^G$ refers to the reference position and attitude information of the reference collector in the calibration coordinate system when the target image collector C collects the target image j; $T_G^C$ refers to the first relative position and attitude value; $M_{ij}$ refers to the second position information of the projection point of the spatial point i in the target image j.

7. The electronic device of claim 6, wherein reconstructing, based on the target images, the three-dimensional scene, and determining the first position information of the spatial point in the three-dimensional scene point cloud in the calibration coordinate system and the second position information of the projection point of the spatial point in each target image comprises:
  determining the second position information by performing a feature point matching on each target image collected by the target image collector at distinct time point; and
  reconstructing, based on a second relative position and attitude value of the target image collector at a first time point when each target image is collected and the second position information, the three-dimensional scene, and determining the first position information.

8. The electronic device of claim 6, wherein when the reference collector is a reference image collector, the reference position and attitude information of the reference collector in the calibration coordinate system when the target image collector collects at least two target images is determined by:
  acquiring each reference image collected by the reference collector when the target image collector collects at least two target images;
  selecting a reference image as a reference calibration image and determining a coordinate system of the reference collector when the reference calibration image is collected as the calibration coordinate system; and
  determining a third relative position and attitude value between another reference coordinate system corresponding to a second time point when another reference image is collected and the calibration coordinate system as the reference position and attitude information of the reference collector in the calibration coordinate system at the second time point.

9. The electronic device of claim 8, wherein determining the third relative position and attitude value between another reference coordinate system corresponding to the second time point when another reference image is collected and the calibration coordinate system comprises:
  determining, based on a first feature point matching result between a first reference image and the reference calibration image, a first relative reference position and attitude value between a first reference coordinate system and the calibration coordinate system;
  constructing, based on the first feature point matching result, the first relative reference position and attitude value and an inner parameter of the reference image collector, a reference scene point cloud;
  determining, based on a second feature point matching result between a second reference image and the reference scene point cloud, a second relative reference position and attitude value between a second reference coordinate system and the calibration coordinate system, and updating the reference scene point cloud; and
  determining the second reference image as a new first reference image, determining a new second reference image and returning to perform determining, based on the first feature point matching result between the first reference image and the reference calibration image, the first relative reference position and attitude value between the first reference coordinate system and the calibration coordinate system.

10. The electronic device of claim 6, wherein after determining the first relative position and attitude value between the target image collector and the reference collector, the method further comprises:
acquiring, based on the first relative position and attitude value between the reference collector and each target image collector, a fourth relative position and attitude value between different target image collectors.

11. A non-transitory computer-readable storage medium having a computer program stored thereon, wherein, when the computer program is executed by a processor, the processor performs the method for calibrating relative parameters of a collector comprising:
determining, based on reference position and attitude information of a reference collector in a calibration coordinate system when a target image collector collects at least two target images and a relative position and attitude variable between the reference collector and the target image collector, target position and attitude information of the target image collector in the calibration coordinate system when each target image is collected by the target image collector;
reconstructing, based on the target images, a three-dimensional scene, and determining first position information of a spatial point in a three-dimensional scene point cloud in the calibration coordinate system and second position information of a projection point of the spatial point in each target image; and
determining, based on the target position and attitude information corresponding to each target image, the first position information and the second position information, a first relative position and attitude value between the target image collector and the reference collector;
wherein, determining, based on the target position and attitude information corresponding to each target image, the first position information and the second position information, the first relative position and attitude value between the target image collector and the reference collector comprises:
constructing, based on the target position and attitude information corresponding to each target image, the first position information and the second position information, a cost function; and
minimizing the cost function and acquiring the first relative position and attitude value between the target image collector and the reference collector till an iteration stopping condition is met;
wherein, constructing, based on the target position and attitude information corresponding to each target image, the first position information and the second position information, the cost function comprises:
constructing the cost function as $F=\Sigma \|Proj(X_i, T_j^G T_G^C) - M_{ij}\|$;
where Proj refers to projecting the spatial point i in the three-dimensional scene point cloud to the target image j; $X_i$ refers to the first position information of the spatial point i in the calibration coordinate system; $T_j^G T_G^C$ refers to the target position and attitude information of the target image collector C in the calibration coordinate system when the target image j is collected by the target image collector C; $T_j^G$ refers to the reference position and attitude information of the reference collector in the calibration coordinate system when the target image collector C collects the target image j; $T_G^C$ refers to the first relative position and attitude value; $M_{ij}$ refers to the second position information of the projection point of the spatial point i in the target image j.

\* \* \* \* \*